US005600096A

United States Patent [19]

Cherry et al.

[11] Patent Number: 5,600,096

[45] Date of Patent: Feb. 4, 1997

[54] MECHANICAL CONNECTOR SPLICE FOR CABLE

[75] Inventors: Hitesh Cherry; Michael A. Kandros; Daniel V. Nardone, all of Harrisburg, Pa.

[73] Assignee: The Whitaker Corporation, Wilmington, Del.

[21] Appl. No.: 312,579

[22] Filed: Sep. 27, 1994

[51] Int. Cl.[6] .................................................... H02G 15/08

[52] U.S. Cl. ............................ 174/84 R; 174/85; 174/92

[58] Field of Search .................................... 174/84 R, 85, 174/94 R, 92; 439/796

[56] References Cited

U.S. PATENT DOCUMENTS

| | | | |
|---|---|---|---|
| 2,166,458 | 7/1939 | Berndt et al. | 174/94 R |
| 3,136,844 | 6/1964 | Petersen | 174/90 X |
| 3,243,500 | 3/1966 | Rabinowitz | 174/84 R |
| 3,515,794 | 6/1970 | Beinhaur et al. | 174/90 |
| 3,681,512 | 8/1972 | Werner et al. | 174/84 R |
| 3,904,814 | 9/1975 | Dawson et al. | 174/84 R |
| 4,029,895 | 6/1977 | Scarborough | 174/138 F X |
| 4,057,187 | 11/1977 | Cranston et al. | 228/107 |
| 4,179,583 | 12/1979 | Sergev | 174/21 R |
| 4,252,992 | 2/1981 | Cherry et al. | 174/90 |
| 4,362,352 | 12/1982 | Hawkins et al. | 339/248 S |
| 4,745,239 | 5/1988 | Conrad | 174/72 R |
| 4,829,146 | 5/1989 | Duve | 174/94 R |
| 5,278,353 | 1/1994 | Buchholz et al. | 174/84 R |

FOREIGN PATENT DOCUMENTS 62-133381 8/1987 Japan .

*Primary Examiner*—Kristine L. Kincaid
*Assistant Examiner*—Chau N. Nguyen

[57] ABSTRACT

The invention relates to a mechanical connector splice for joining a pair of aligned cables, such as helically wound aluminum or copper conductors, where such cables are a part of the distribution system of a power network. The splice includes an outer, generally circular metal shell, typically aluminum or copper, consisting of a midportion and a pair of tapered end portions, where each end portion terminates in an opening into which the cable is received. Within the shell are a pair of generally circular tapered inserts within the respective end portions, and the insert is arranged to move axially of the metal shell to securely engage the cable. Further, a spacer member is provided within the midportion to initially position the tapered inserts, where the spacer member includes a pair of pusher members positioned to exert an axial movement on a respective insert. Finally, an access is included in the metal shell and spacer member to receive an externally applied tool to effect the axial movement on the inserts in a manner to securely grip the respective aligned cables.

9 Claims, 5 Drawing Sheets

MECHANICAL CONNECTOR SPLICE FOR CABLE

BACKGROUND OF THE INVENTION

The present invention is directed to a mechanical connector for splicing a pair of cables of the type used in electrical utility style overhead distribution systems. In other words, these cables typically are a part of the distribution portion of the power network. The cables are designated AAC, AAAC, or ACSR which stand for all aluminum, all aluminum alloy conductor, or aluminum conductor steel reinforced, respectively, or they may be copper, where cable diameters are in the range of ¾ to 1 inch. In contrast, transmission cables are typically stranded aluminum conductors about a steel reinforcing core (ACSR) having a diameter from ¾ inch and up.

There are a number of patents directed to splicing transmission type cable, where the inventions thereof rely upon devices which are internally fired or explosively activated. U.S. Pat. No. 4,252,992, assigned to the assignee hereof, relates to a device for splicing a pair of aligned ACSR cables. The device includes outer and inner housings. A firing barrel and associated pistons are positioned within the inner housing along with a first set of cable gripping jaws. A second set of cable gripping jaws are positioned within the first housing and are in tandem with the first set of jaws.

Two earlier versions of an explosively actuated splice are taught in U.S. Pat. Nos. 3,515,794 and 3,681,512, both of which are assigned to the assignee hereof. In the former, two sets of cable gripping jaws are loaded in tandem in a conical shell. A piston is driven against the inner set of jaws which in turn drives the outer set, where a preferred method of driving the jaws employs a firing chamber and a propellant. In the latter patent, the device includes cable gripping jaws housed in a conical sleeve. The jaws are driven by an explosive-powered piston. In one embodiment of the device, there are two sets of jaws, one within the other, to be used with ACSR cable. In this disclosure, the set of jaws used to grip the inner core of steel wire is positioned within the jaws which grip the outer and larger diameter aluminum strands. Both sets of jaws are driven simultaneously by one piston.

Another prior art device for mechanically joining a pair of cables is disclosed in U.S. Pat. No. 4,362,352. The device comprises a tubular housing having a tapered portion converging toward an open end of the housing, where the housing contains a unitary, tubular, conductor gripping member. The conductor gripping member has an outer tapered surface converging toward one of its ends and toward the open end of the housing. The termination is accomplished by at least one coil spring made of relatively large gauge spring material held in compression within the housing and in a manner that will drive the conductor gripping member toward the open end of the housing with substantial force when the compression of the spring is released.

All of these prior art devices require a complex, internal mechanism by which to join or terminate a pair of aligned cables. The present invention provides for a simple, yet effective, mechanical system for joining a pair of aligned cables, where such system may be activated by an externally applied tool. The unique features of this invention will become apparent in the description which follows, particularly when read in conjunction with the accompanying drawings.

SUMMARY OF THE INVENTION

This invention relates to a mechanical splicing system for a pair of cables of the type used in electrical utility style overhead distribution systems. The mechanical splice comprises an outer, generally circular metal shell consisting of a midportion and a pair of tapered, conical end portions, where each said end portion terminates in an opening into which said cable is received. Within each end portion is a generally conical configured insert arranged to move axially of the metal shell to securely engage the cable. Further, a spacer member is provided within the midportion to initially position the inserts, where the spacer member includes a pair of pusher members positioned to exert an axial movement on a respective insert. Finally, access means are included in the metal shell and spacer member for an externally applied tool to effect the axial movement of the inserts in a manner to securely grip the respective aligned cables.

BRIEF DESCRIPTION OF THE DRAWINGS

FIG. 5 is a longitudinal sectional view of a cable loaded splice, with the externally applied tool in position to effect termination and securing the cables therewithin.

DETAILED DESCRIPTION OF PREFERRED EMBODIMENT

Figure 1:
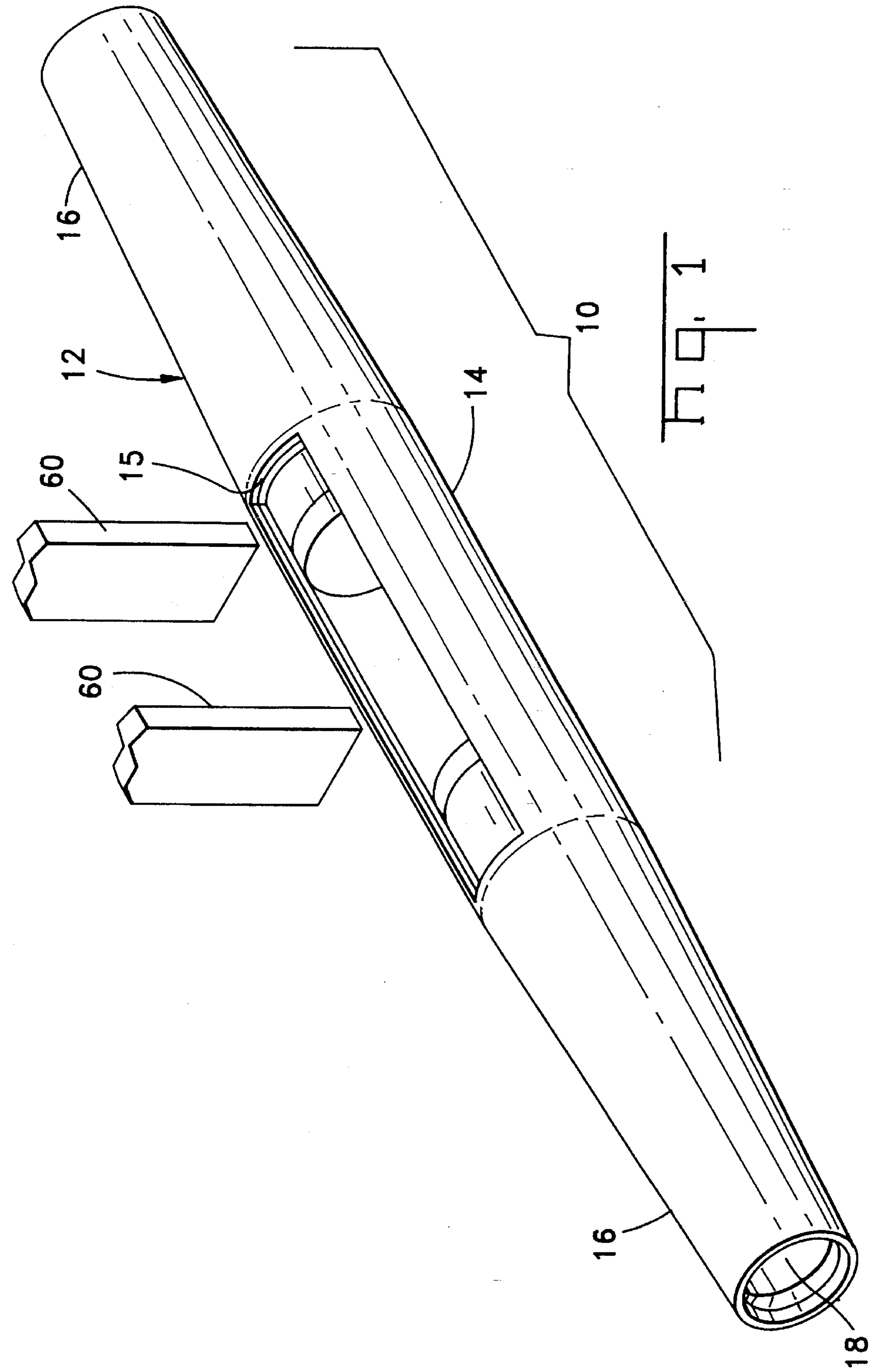
FIG. 1 is a perspective view of an assembled mechanical connector splice according to this invention, further showing a pair of blades of an externally applied tool poised for terminating the splice.

This invention is directed to mechanical splice 10 for joining a pair of aligned cables, such as helically wound aluminum or copper strands, the type used for electrical utility style overhead distribution conductors. For a description of the splice of this invention, reference is made to FIGS. 1 and 2. The splice 10 according to this invention comprises an outer, generally circular metal shell 12, such as aluminum or copper, having a midportion 14 of an essentially uniform cross section throughout, a tool access opening 15 only one being shown, where the second one is on the opposite side, and two end portions 16. The end portions 16 are tapered from the midportion 14 to a concentric opening 18, as will be apparent hereinafter, which receives a cable end to be secured within the splice.

Figure 2:
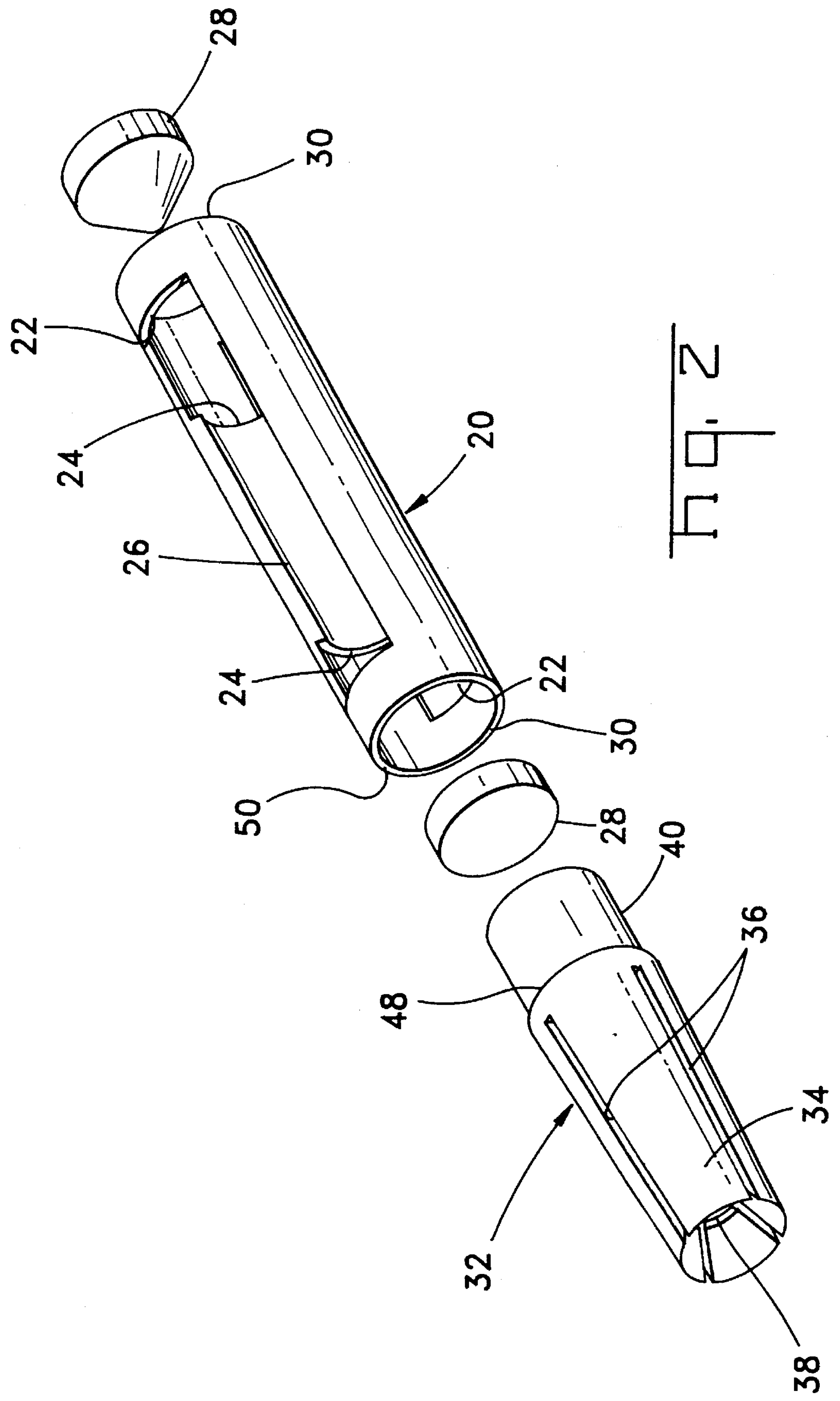
FIG. 2 is an exploded perspective view of certain of the internal components of the splice of FIG. 1.

Internally of the splice 10, a number of components are provided. Illustrated in FIG. 2 is a first component identified as a spacer member 20. The spacer member 20 has a cylindrical body dimensioned to be slidably received within the midportion 14. On opposing sides thereof, tool access openings 22 are provided, where such openings, in an operative arrangement, coincide with the corresponding openings 15 in the metal shell 12. A further feature of the spacer member 20 is the provision of arcuate shoulders 24 extending between the respective openings 22. Such shoulders may be formed by machining the spacer member 20 to leave a pair of thicker wall segments 26. While providing further stability and strength to the spacer member, the shoulders 24 also function as axial stops to the pusher members 28. The pusher members, essentially disk shaped, are slidable received into the spacer member through the respective openings 30.

Figure 3:
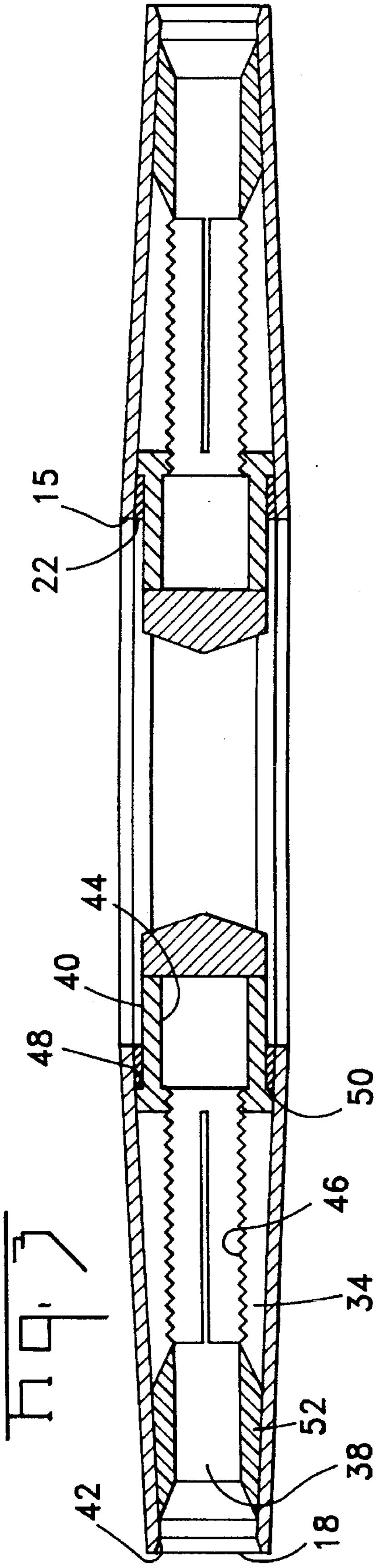
FIG. 3 is a longitudinal sectional view of the assembled splice of this invention.
Figure 4:
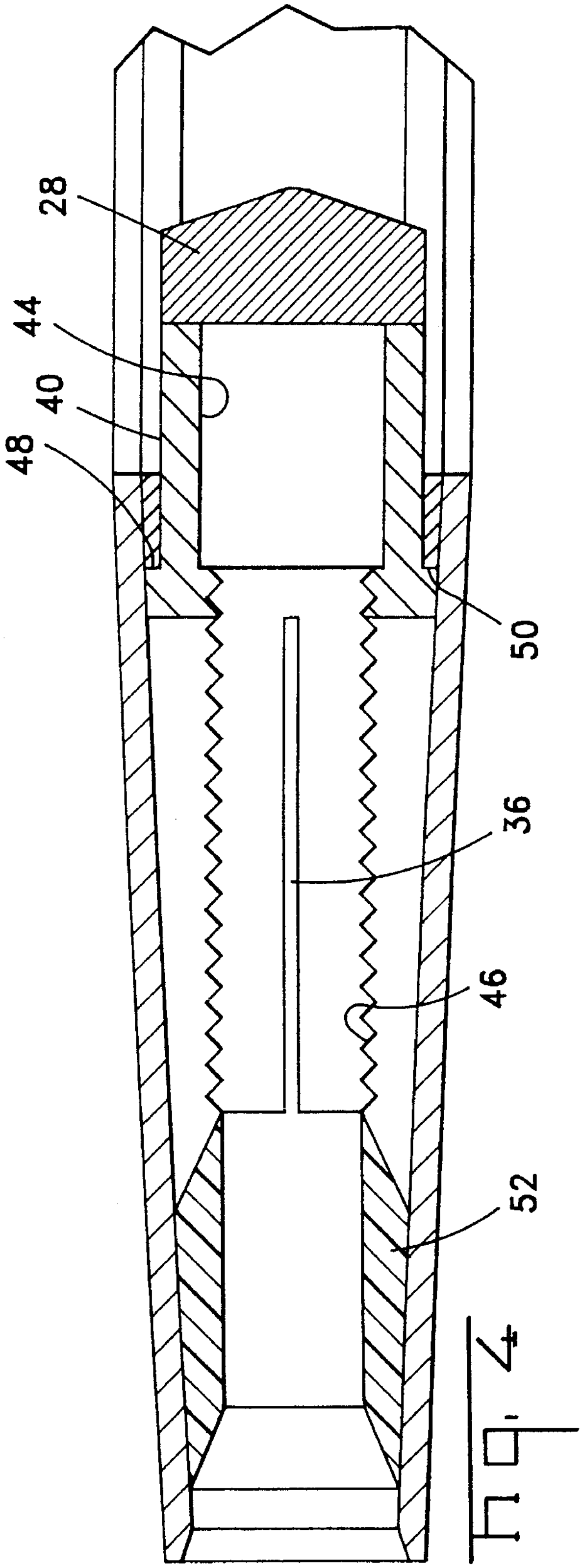
FIG. 4 is an enlarged, partial sectional view of one end of the splice of FIG. 3.

Further major components for receipt in the spacer member 20 are a pair of conical configured inserts 32, with only one being shown in FIG. 2. Each insert 32 comprises a conical body portion 34, having plural segmenting slots 36 therealong, a central cable receiving bore 38, and a reduced end portion 40. For additional internal features of the insert 32, reference may be made to FIG. 3 and 4. The central bore 38, extending between the tapered opening 42, and an expanded, concentric chamber 44 within the end portion 40, is provided with serrations 46 for securely gripping the cables "C" seated therein. Note in FIG. 3, the relative position of the various components in a predetermined condition, the annular shoulder 48 between the body portion 34 of the insert 32 and the reduced end portion 40 abuts the end wall 50 of the spacer member 20. Disposed adjacent the tapered opening 42 is a circular termination indicator 52, typically an elongated tubular ring formed of a polymer. In the terminated state, as illustrated in FIGS. 6 and 7, the indicator 52, which encircles the cable "C", is partially pushed through the opening 18 where it is readily visible to a ground observer to confirm a terminated and secured cable.

Figure 7:
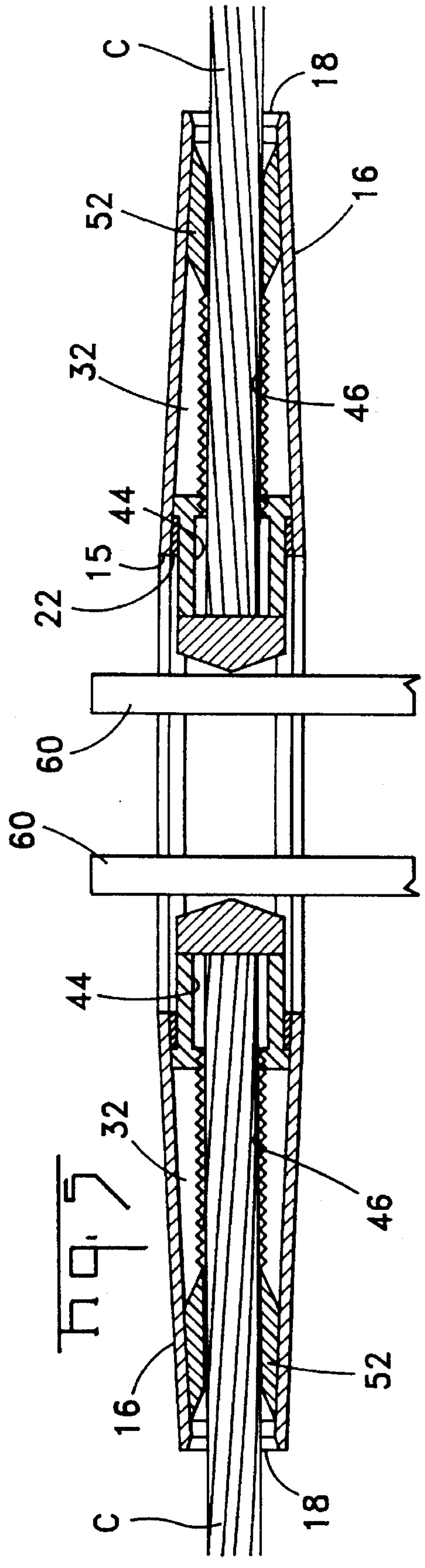
FIG. 7 is an enlarged sectional view of one end of the terminated splice of FIG. 6.
Figure 6:
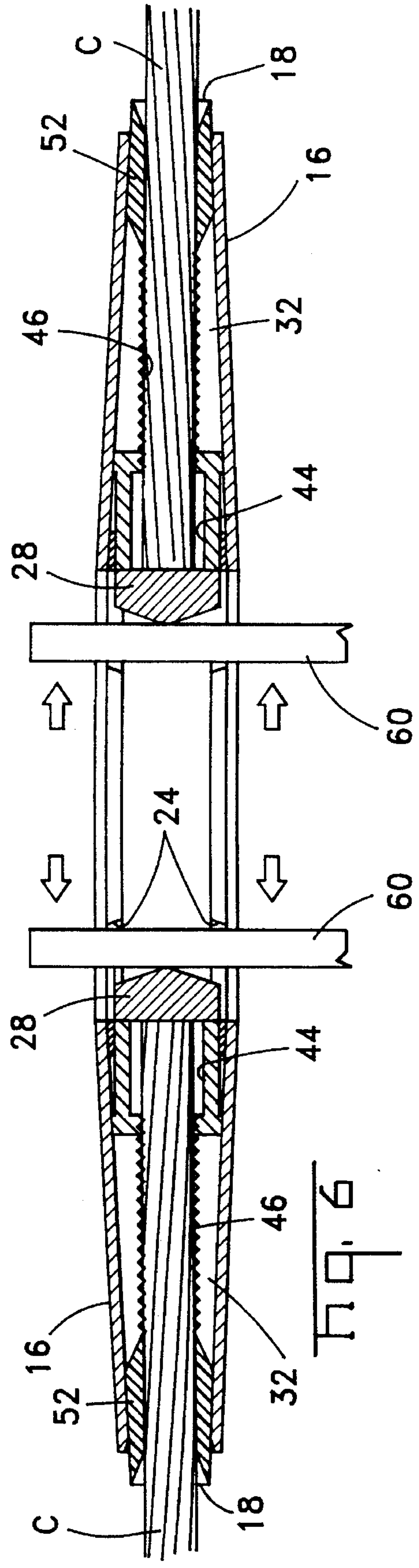
FIG. 6 is a sectional view similar to FIG. 5 showing the terminated and secured cables.
Figure 7:
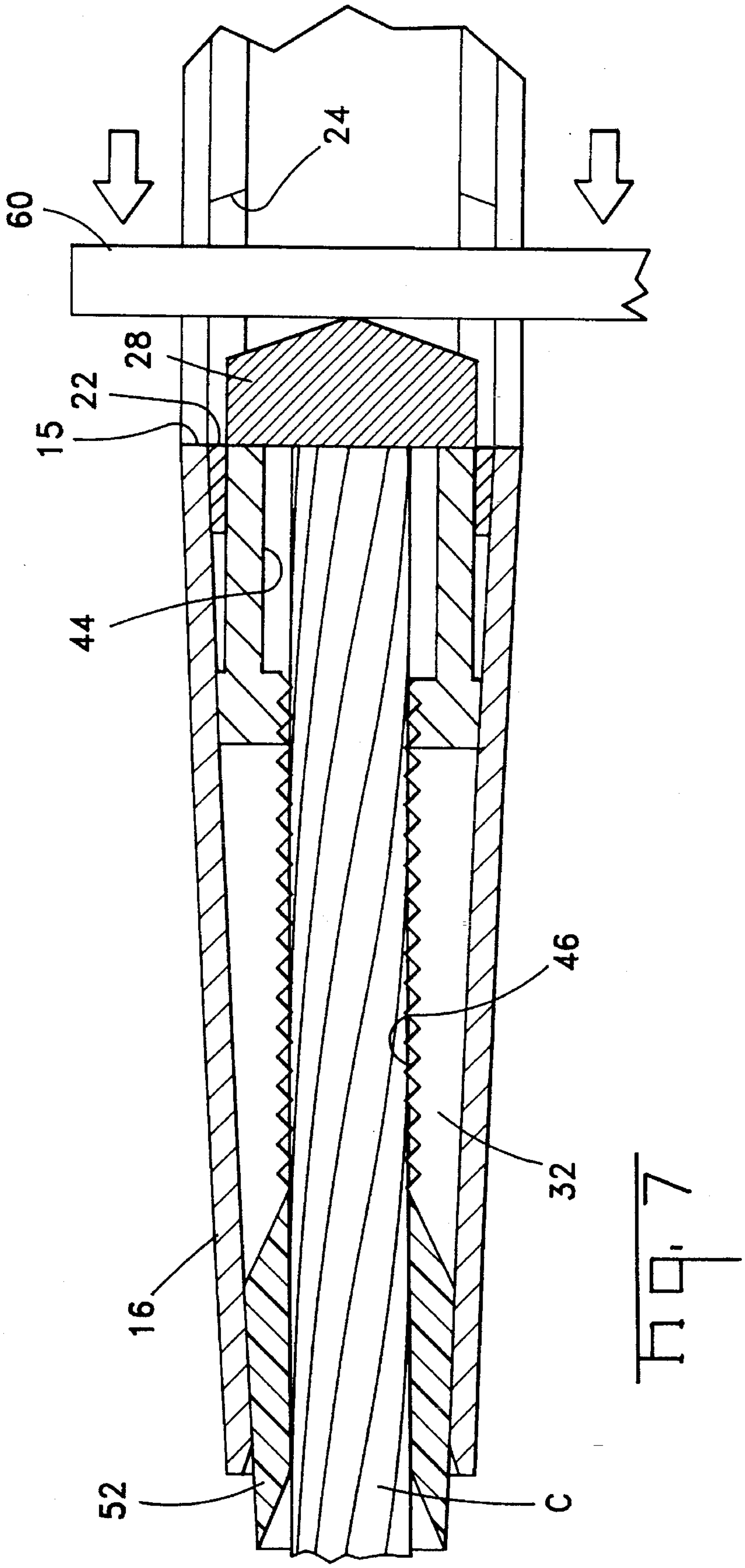

Turning now to FIGS. 5 to 7 illustrating the termination operation, in FIG. 5 it will be seen that the cables "C" have been inserted through respective openings 18 into the chambers 44 against the pusher members 28. Thereafter, and externally applied tool, which may be provided with a pair of blades or legs 60, is inserted through the respective openings 15, 22 against the pusher members 28. To effect termination, the tool legs 60 are spread apart urging the pusher members 28 toward the respective splice openings 18. The pusher members in turn, act against the inserts 32 pushing same toward the openings 18, while at the same time forcing the serrations 46 into gripping contact with cable "C". It will be recalled that the insert body portion 34 includes segmenting slots 36 so that the respective segments therebetween can flex and move inwardly toward the cable by virtue of the camming action of the tapered internal diameter of the end portion 16. Concurrent with this intimate gripping of the cable, the polymeric indicators are pushed through the openings 18 to visibly indicate a securely terminated cable.

Further, since the cable "C" is also being shifted or pushed axially, the oversized chamber 44, into which the cable end is received, allows the cable end to spread therein, see FIGS. 6 and 7, and provide some relief to the contained cable.

To assemble the mechanical splice connector of this invention, a metal tubular member of a predetermined diameter, such as aluminum is secured. With opposing slotted openings 15 provided along a center portion thereof, the spacer member 20 is slidably inserted into the tubular member, where its elongated openings 22 are aligned with the corresponding openings 15 in the tubular member. Thereafter, into each end the components are sequentially inserted, namely, pusher member 28, insert 32, and polymeric indicator 52. With the various components positioned within the tubular member, the respective end portions 16 are collapsed, such as by the application of tooling while spinning, as known in the art, where the internal wall thereof contacts the conical body portion 34. In this condition, the mechanical connector splice may receive and securely terminate a pair of aligned cables.

We claim:

1. A mechanical connector splice for joining a pair of aligned cables, said splice comprising (a) an outer, generally circular metal shell consisting of a midportion and a pair of tapered, conical end portions, where each said end portion terminates in an opening into which one of said cables is received, (b) a generally conical configured insert within each said end portion, said insert being arranged to move axially of said metal shell to securely engage said one of said cables, (c) a spacer member within said midportion to initially position said inserts; where said spacer member includes a pair of pusher members positioned to exert an axial movement on a respective said insert, said pusher members being circular disks, and (d) access means in said metal shell and spacer member for an externally applied tool to effect said axial movement on said inserts in a manner to securely grip the respective said aligned cables.

2. The mechanical connector splice according to claim 1, wherein said inserts are provided with plural axially oriented slots to allow segments therebetween to move inwardly as a result of their movement toward said openings.

3. The mechanical connector splice according to claim 2, wherein each said insert includes an axial bore for receiving said one of said cables.

4. The mechanical connector splice according to claim 3, wherein said bore is serrated to effectively capture and secure said one of said cables therewithin.

5. The mechanical connector splice according to claim 1, wherein said tapered end portions include termination indicators adjacent said openings, where said termination indicators are pushed through said openings during axial movement of said inserts to visually indicate secure termination of said cables.

6. The mechanical connector splice according to claim 5, wherein said termination indicators are circular shaped and override said one of said cables.

7. The mechanical connector splice according to claim 3, wherein said inserts include an end adjacent said pusher members where said end includes a chamber which is concentric with and larger than said bore.

8. The mechanical connector splice according to claim 7, wherein an end of said one of said cables is received in said chamber.

9. The mechanical connector splice according to claim 1, wherein said spacer member is a generally cylindrical tubular member arranged to lie contiguous with the internal wall of said midportion.

* * * * *